United States Patent [19]
Okamoto et al.

[11] Patent Number: 6,058,251
[45] Date of Patent: May 2, 2000

[54] DATA TRANSMISSION SYSTEM

[75] Inventors: Rikiya Okamoto; Hirokazu Kaneko, both of Kawasaki, Japan

[73] Assignee: Fujitsu Limited, Kawasaki, Japan

[21] Appl. No.: 08/719,420

[22] Filed: Sep. 24, 1996

[30] Foreign Application Priority Data

Dec. 14, 1995 [JP] Japan ..................................... 7-325341

[51] Int. Cl.[7] .................................................. G06F 13/14
[52] U.S. Cl. ...................... 395/287; 395/307; 364/242.34
[58] Field of Search .................... 395/306, 307, 395/287, 290; 364/240, 291.9, 292.3, 292.31, 242.34, 243.41

[56] References Cited

U.S. PATENT DOCUMENTS

| | | | |
|---|---|---|---|
| 5,185,694 | 2/1993 | Edenfield et al. | 395/287 |
| 5,237,676 | 8/1993 | Arimilli et al. | 395/290 |
| 5,274,784 | 12/1993 | Arimilli et al. | 395/306 |
| 5,509,126 | 4/1996 | Oprescu et al. | 395/307 |

*Primary Examiner*—Zarni Maung
*Assistant Examiner*—David M. Ovedovitz
*Attorney, Agent, or Firm*—Staas & Halsey

[57] ABSTRACT

A data transmission system in which data read out of a first memory is transmitted to a second memory, includes a data buffer for temporarily storing data to be transmitted from the second memory, an identifying module for identifying a maximum permissible transmission unit defined by a bus/address boundary rule for addresses of the second memory, a deciding module for deciding a transmission unit of data to be transmitted to the second memory based on an amount of data which should be transmitted but has not yet been transmitted and the maximum permissible transmission unit identified by the identifying module, a storing control module for reading data for the transmission unit decided by the deciding module out of the first memory starting from data stored at an identified address of the first memory, in accordance with the bus/address boundary rule for the address of the first memory, and for storing the data in the data buffer, and a transmission control module for transmitting a batch of data stored in the data buffer to the second memory.

12 Claims, 11 Drawing Sheets

FIG. 3

| ADDRESS | PERMISSIBLE TRANSMISSION UNIT |
|---|---|
| "0" | 1, 2, 4, 8, 16 BYTES |
| "1" | 1 BYTE |
| "2" | 1, 2 BYTES |
| "3" | 1 BYTE |
| "4" | 1, 2, 4 BYTES |
| "5" | 1 BYTE |
| "6" | 1, 2 BYTES |
| "7" | 1 BYTE |
| "8" | 1, 2, 4, 8 BYTES |
| "9" | 1 BYTE |
| ⁓ | ⁓ |

FIG. 4

| ADDRESS | DATA |
|---|---|
| "0" | 1 BYTE |
| "1" | 1 BYTE |
| ⁓ | ⁓ |

DATA TRANSMISSION SYSTEM

BACKGROUND OF THE INVENTION

Field of the Invention

The present invention generally relates to a data transmission system in which data read out of a memory is transmitted to another memory, and more particularly to a data transmission system by which data transmission requests can be supplied to the data transmission system without consideration of bus/address boundary rules.

A DMA controller which is a type of data transmission system performs data transmission control between memories. When the DMA controller receives DMA information (an address of a transmission side memory, an address of a receiving side memory, the amount of data to be transmitted and a transmission unit), the DMA controller performs the data transmission control so that data read out of the transmission side memory is transmitted to the receiving side memory without interposition of a CPU. A bus connected to the DMA controller is applied with a bus/address boundary rule which indicates a data length capable of being accessed from an address.

Under the bus/address boundary rule applied to a bus, the data length accessed from an address in a data transmission operation through the bus is limited as follows.

For example, in a data transmission operation from an address "0", data having data lengths of 1 byte, 2 bytes, 4 bytes, 8 bytes and 16 bytes can be accessed. From an address "1", only data having a data length of 1 byte can be accessed and from an address "2", data having data lengths of 1 byte and 2 bytes can be accessed. In a data transmission operation from an address "3", only data having a data length of 1 byte can be accessed and from an address "4", data having data lengths of 1 byte, 2 bytes and 4 bytes can be accessed. Further, in a data transmission operation from an address "5", only data having a data length of 1 byte can be accessed and from an address "6", data having data lengths of 1 byte and 2 bytes can be accessed.

Thus, in the data transmission operation using the DMA system, a unit amount of data to be transmitted has to be selected in accordance with the address. The unit amount of data to be transmitted is referred to as a transmission unit.

However, it is difficult to select the transmission unit in accordance with the address from which data is accessed. Thus, in a conventional case, the transmission unit is limited to a minimum value (e.g., 1 byte) which can be accessed from all addresses.

On the other hand, when the transmission unit is not limited to the minimum value, addresses of the transmission side memory and the receiving side memory (and the amount of data to be transmitted which does not agree with the bus/address boundary rule for the bus) are inhibited in the data transmission control. In addition, it is required that the addresses of the transmission side memory and the receiving side memory and the amount of data to be transmitted have to agree with the bus/address boundary rule for the bus. As a result, the data transmission control is performed under a condition in which a relationship between a specified address and a specified transmission unit satisfies the bus/address boundary rule. In addition, the data transmission control is performed in a manner based on a difference between the bus/address boundary rules for buses for the transmission side memory and the receiving side memory.

However, in the case where the transmission unit is limited to the minimum value, the data transmission speed is decreased.

In the case where addresses of the transmission side memory, the receiving side memory, and the amount of data to be transmitted do not agree with the bus/address boundary rule for the bus, data transmission control is inhibited. Further, in the case where it is required that the addresses of the transmission side memory and the receiving side memory and the amount of data to be transmitted have to agree with the bus/address boundary rule for the bus, the request for the data transmission operation to the DMA system has to be performed in consideration of the bus/address boundary rule. In the latter case, a large amount of shifting operations have to be performed.

SUMMARY OF THE INVENTION

Accordingly, a general object of the present invention is to provide a novel and useful data transmission system in which the disadvantages of the aforementioned prior art are eliminated.

A specific object of the present invention is to provide a data transmission system in which data can be transmitted at a high speed.

Another object of the present invention is to provide a data transmission system by which the data transmission request can be performed without considering the bus/address boundary rules for buses.

The above objects of the present invention are achieved by a data transmission system in which data read out of a first memory is transmitted to a second memory, comprising: buffer means for temporarily storing data to be transmitted from said second memory; first identifying means for identifying a maximum permissible transmission unit defined by a bus/address boundary rule for addresses of said second memory, the maximum permissible transmission unit being a maximum data length which can be accessed in a single transmission operation based on the bus/address boundary rule; first deciding means for deciding a transmission unit of data to be transmitted to said second memory based on an amount of data which should be transmitted but has not yet been transmitted and the maximum permissible transmission unit identified by said first identifying means, the transmission unit being a unit amount of data to be transmitted; storing control means for reading data for the transmission unit decided by said first deciding means out of said first memory starting from data stored at an identified address of said first memory, in accordance with the bus/address boundary rule for the address of the first memory, and for storing the data in said buffer means; and transmission control means for transmitting a batch of data stored in the buffer means to said second memory.

The above objects of the present invention are also achieved by a data transmission system in which data read out of a first memory is transmitted to a second memory, comprising: buffer means for temporarily storing data to be transmitted to said second memory; first identifying means for identifying a maximum permissible transmission unit defined by a bus/address boundary rule for addresses of said first memory, the maximum permissible transmission unit being a maximum data length which can be accessed in a single transmission operation based on the bus/address boundary rule; first deciding means for deciding a transmission unit of data to be read out of said first memory based on an amount of data which should be transmitted but has not yet been transmitted and the maximum permissible transmission unit identified by said first identifying means, the transmission unit being a unit amount of data to be transmitted; storing control means for reading out a batch of data for the transmission unit decided by said first deciding means from said first memory starting from data stored at an identified address of said first memory; and transmission control means for transmitting the data stored in said buffer means to said second memory in accordance with the bus/address boundary rule for addresses of said second memory.

Further, the above objects of the present invention are also achieved by a data transmission system in which data read out of a first memory is transmitted to a second memory, comprising: buffer means for temporarily storing data to be transmitted to said second memory; selecting means for selecting, as standard addresses, either addresses of said first memory or addresses of said second memory; first identifying means for identifying a maximum permissible transmission unit defined by a bus/address boundary rule for the addresses selected as the standard addresses by said selecting means, the maximum permissible transmission unit being a maximum data length which can be accessed in a single transmission operation based on the bus/address boundary rule; first deciding means for deciding a transmission unit of data to be transmitted to said second memory when said selecting means selects the address of said second memory and for deciding a transmission unit of data to be read out of said first memory when said selecting means selects the address of said first memory, based on an amount of data which should be transmitted but has not been transmitted and the maximum permissible transmission unit identified by said first identifying means, the transmission unit being a unit amount of data to be transmitted; first storing control means for, when said selecting means selects the address of said second memory as the standard address, reading out data for the transmission unit decided by said first deciding means from said first memory starting from data stored at an identified address of said first memory, in accordance with the bus/address boundary rule, and for storing the data in said buffer means; second storing control means for, when said selecting means selects the address of said first memory as the standard addresses, reading out a batch of data for the transmission unit decided by said first deciding means from said first memory starting from data stored at an identified address of said first memory; and transmission control means for transmitting a batch of data stored in said buffer means to said second memory when said selecting means selects the addresses of said second memory as the standard addresses and for transmitting the data stored in said buffer means to said second memory in accordance with the bus/address boundary rule for the address of said second memory when said selecting means selects the address of said second memory as the standard addresses.

According to the present invention, the data transmission system controls the addresses of the first and second memories in a data transmission operation in accordance with the bus/address boundary rules for the addresses of the first and second memories. Thus, the data transmission request can be performed without considering the bus/address boundary rules for buses (the addresses) of the first and second memories. In addition, the data read out of the first memory can be transmitted to the second memory at a high speed.

BRIEF DESCRIPTION OF THE DRAWINGS

Other objects, features and advantages of the present invention will be apparent from the following description when read in conjunction with the accompanying drawings, in which:

FIG. 3 is a diagram illustrating an example of a bus/address boundary rule;

FIG. 4 is a diagram illustrating an example of a structure of a memory;

DETAILED DESCRIPTION OF THE PREFERRED EMBODIMENTS

A description will be given, with reference to FIG. 1, of an aspect of a data transmission system according to the present invention.

Figure 1:
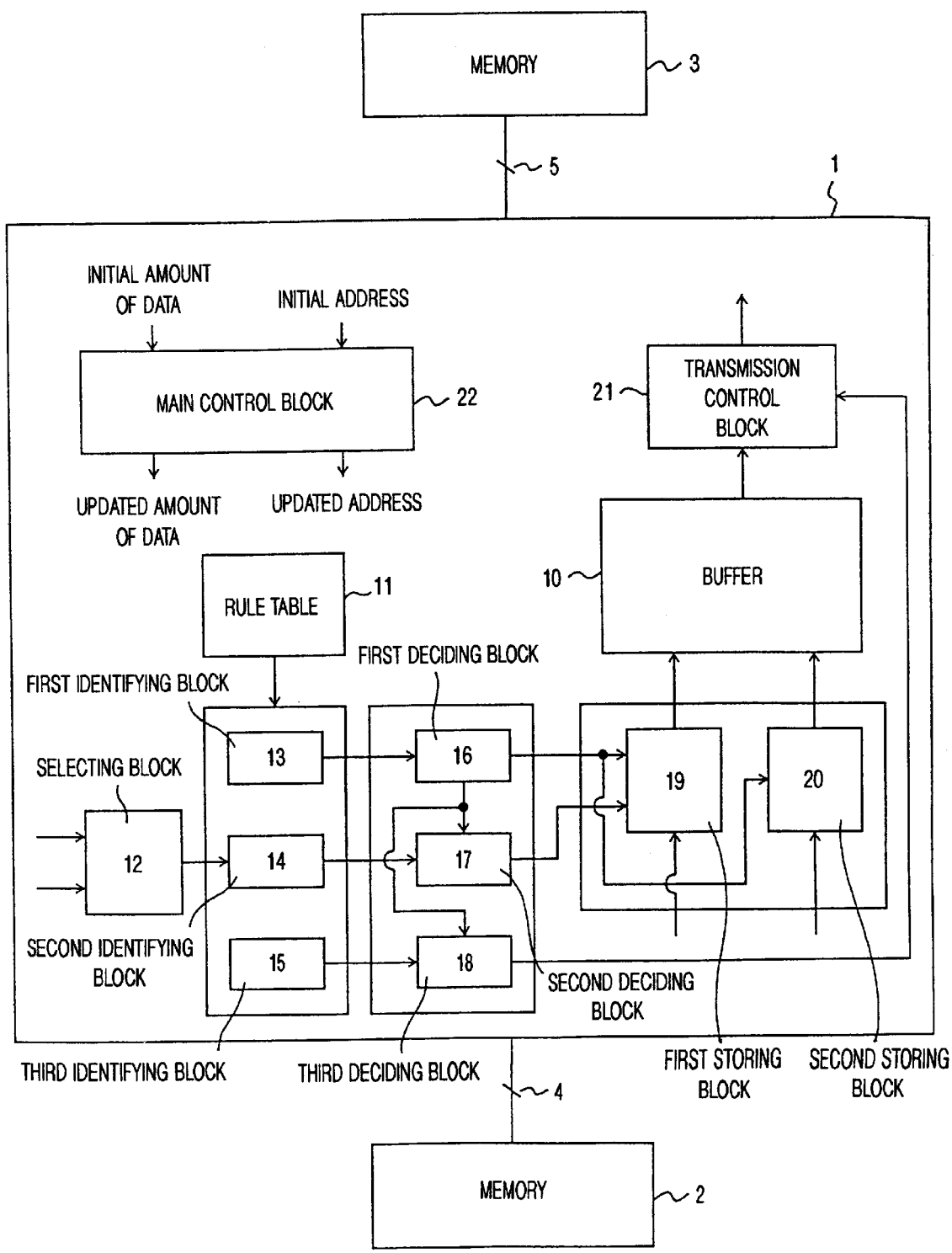
FIG. 1 is a block diagram illustrating a functional structure of a data transmission system according to an embodiment of the present invention.

Referring to FIG. 1, a data transmission system 1 is provided between a memory 2 and a memory 3. The memory 2 is referred to as a transmission side memory from which data should be read out and transmitted. The memory 3 is referred to as a receiving side memory which should receive and stores transmitted data. The transmission side memory 2 is connected to the data transmission system 1 by a first bus 4. The receiving side memory 3 is connected to the data transmission system 1 by a second bus 5. The data transmission system 1 has a buffer 10, a rule table 11, a selecting block 12, a first identifying block 13, a second identifying block 14, a third identifying block 15, a first deciding block 16, a second deciding block 17, a third deciding block 18, a first storing block 19, a second storing block 20, a transmission control block 21 and a main control block 22.

The buffer 10 is temporarily stored with data which should be transmitted to the receiving side memory 3. The rule table 11 manages the bus/address boundary rule for the respective first and second buses 4 and 5. The selecting block 12 selects, as standard addresses, either addresses of the receiving side memory 3 or addresses of the transmission side memory 2.

The first identifying block 13 identifies, with reference to the rule table 11, a maximum permissible transmission unit defined in the bus/address boundary rule for the standard addresses selected by the selecting block 12. The maximum permissible transmission unit is the maximum data length which can be accessed in a single transmission operation based on the bus/address boundary rule.

The second identifying block 14 identifies, with reference to the rule table 11, a maximum permissible transmission unit defined in the bus/address boundary rule for the addresses of the transmission side memory 2 when the selecting block 12 selects the addresses of the receiving side memory 3.

The third identifying block 15 identifies, with reference to the rule table 11, a maximum permissible transmission unit defined in the bus/address boundary rule for the addresses of the receiving side memory 3 when the selecting block 12 selects the addresses of the transmission side memory 2.

When the selecting block 12 selects the addresses of the receiving side memory 3, the first deciding block 16 decides a transmission unit of data which should be transmitted to the receiving side memory 3, based on an amount of data which should be transmitted but has not been yet transmitted and the maximum permissible transmission unit identified by the first identifying block 13. The transmission unit is the unit amount of data to be transmitted, that is, the data length which should be transmitted in a single transmission operation. When the selecting block 12 selects the addresses of the transmission side memory 2, the first deciding block 16 decides a transmission unit of data which should be read out from the transmission side memory 2. The maximum permissible transmission unit of data which is transmitted to the receiving side memory 3 may be identified. In this case, the deciding block 16 decides the transmission unit of data which should be transmitted to the receiving side memory 3 under a condition in which the transmission unit is not greater than the maximum permissible transmission unit. The maximum permissible transmission unit of data which is read out from the transmission side memory 2 may be identified. In this case, the deciding block 16 decides the transmission unit of data which should be read out from the transmission side memory 2 under the condition in which the transmission unit is not greater than the maximum permissible transmission unit.

When the selecting block 12 selects the addresses of the receiving side memory 3, the second deciding block 17 decides a transmission unit of data which is read out from the transmission side memory 2, based on the transmission unit decided by the first deciding block 16 and maximum permissible transmission unit identified by the second identifying block 14. The maximum permissible transmission unit of data which is read out from the transmission side memory 2 may be identified. In this case, the second deciding block 17 decides the transmission unit of the data which is read out from the transmission side memory 2 under a condition in which the transmission unit is not greater than the maximum permissible transmission unit.

When the selecting block 12 selects the addresses of the transmission side memory 2, the third deciding block 18 decides a transmission unit of data which is transmitted to the receiving side memory 3, based on the transmission unit decided by the first deciding block 16 and the maximum permissible transmission unit identified by the third identifying block 15. The maximum permissible transmission unit of data which is transmitted to the receiving side memory 3 may be identified. In this case, the third deciding block 18 decides the transmission unit of the data which is transmitted to the receiving side memory 3 under a condition in which the transmission unit is not greater than the maximum permissible transmission unit.

When the selecting block 12 selects the addresses of the receiving side memory 3, the first storing block 19 reads out data from the transmission side memory 2. In this case, the data for the transmission unit, decided by the first deciding block 16, starting from data stored at identified addresses of the transmission side memory 2 is read out in accordance with the bus/address boundary rule for the address of the transmission side memory 2. The data read out from the transmission side memory 2 is stored in the buffer 10 by the first storing block 19.

When the selecting block 12 selects the addresses of the transmission side memory 2, the second storing block 20 reads out data from the transmission side memory 2. In this case, a batch of data for the transmission unit, decides by the first deciding block 16, starting from data stored at an identified address of the transmission side memory 2 is read out. The batch of data read out from the transmission side memory 2 is stored in the buffer 10 by the second storing block 20.

When the selecting block 12 selects the addresses of the receiving side memory 3, the transmission control block 21 transmits a batch of data stored in the buffer 10 to the receiving side memory 3. When the selecting block 12 selects the addresses of the transmission side memory 2, the transmission control block 21 transmits the data stored in the buffer 10 to the receiving side memory 3, in accordance with the bus/address boundary rule for the addresses of the receiving side memory 3.

The main control block 22 calculates an amount of data which should be transmitted but has not yet been transmitted, addresses of the transmission side memory 2 and addresses of the receiving side memory 3, all of which are updated with the progress of data transmission.

In the system described above, if the addresses of the receiving side memory 3 are fixed as the standard addresses, the selecting block 12, the third identifying block 15, the third deciding block 18 and the second storing block 20 are not needed. On the other hand, if the addresses of the transmission side memory 2 are fixed as the standard addresses, the selecting block 12, the second identifying block 14, the second deciding block 17 and the first storing block 19 are not needed.

In the system described above, the data transmission operation is performed as follows.

When the selecting block 12 selects the addresses of the receiving side memory 3 as the standard addresses, the first identifying block 13 identifies the maximum permissible transmission unit defined in the bus/address boundary rule for the address of the receiving side memory 3. On the other hand, at this time, the second identifying block 14 identifies the maximum permissible transmission unit defined in the bus/address boundary rule for the address of the transmission side memory 2.

When the first deciding block 16 receives the identification result from the first identifying block 13, the first deciding block 16 decides, based on the amount of data which should be transmitted but has not yet been transmitted and the maximum permissible transmission unit identified by the first identifying block 13, the transmission unit of data which is transmitted to the receiving side memory 3. When the second deciding block 17 receives the decided result from the first deciding block 16, the second deciding block 17 decides, based on the transmission unit decided by the first deciding unit 16 and the maximum permissible transmission unit identified by the second identifying block 14, the transmission unit of data which is read out from the transmission side memory 2.

When the first storing block 19 receives the decided result from the second deciding block 17, the first storing block 19 reads out from the transmission side memory 2 data for the transmission unit decided by the first identifying block 16.

The data is read out by the transmission unit decided by the second deciding block 17 with updating of the address of the transmission side memory 2. The data read out from the transmission side memory 2 is then stored in the buffer 10 by the transmission unit decided by the second deciding block 17, so that the data for the transmission unit decided by the first deciding block 16 is stored in the buffer 10.

After this, the transmission control block 21 transmits a batch of data stored in the buffer 10 to the receiving side memory 3.

On the other hand, when the selecting block 12 selects the addresses of the transmission side memory 2 as the standard addresses, the first identifying block 13 identifies the maximum permissible transmission unit defined in the bus/address boundary rule for the addresses of the transmission side memory 2. The third identifying block 15 identifies the maximum permissible transmission unit defined in the bus/address boundary rule for the addresses of the receiving side memory 3.

The first deciding block 16 which receives the result obtained by the first identifying block 13 then decides, based on the amount of data which should be transmitted but has not yet been transmitted and the maximum permissible transmission unit identified by the first identifying block 16, a transmission unit of data which should be read out from the transmission side memory 2. After this, the third deciding block 18 decides, based on the transmission unit decided by the first deciding block 16 and the maximum permissible transmission unit identified by the third identifying block 15, a transmission unit of data which should be transmitted to the receiving side memory 3.

The second storing block 20 which receives the result obtained by the first deciding block 16 then reads out from the transmission side memory 2 a batch of data for the transmission unit decided by the first deciding block 16 starting from data stored at an identified address of the transmission side memory 2. The batch of data read out from the transmission side memory 2 is stored in the buffer 10.

After this, the transmission control block 21 reads out and transmits the data from the buffer 10 to the receiving side memory 3. In this case, the data is read out by the transmission unit decided by the third deciding block 18 with updating the address of the receiving side memory 3.

In the system described above, the data transmission operations between the transmission side memory 2 to the receiving side memory 3 can be performed without consideration of the bus/address boundary rules for the buses for the memories. In addition, the data transmission operations can be performed at a high speed.

A description will now be given of an embodiment of the present invention.

Figure 2:
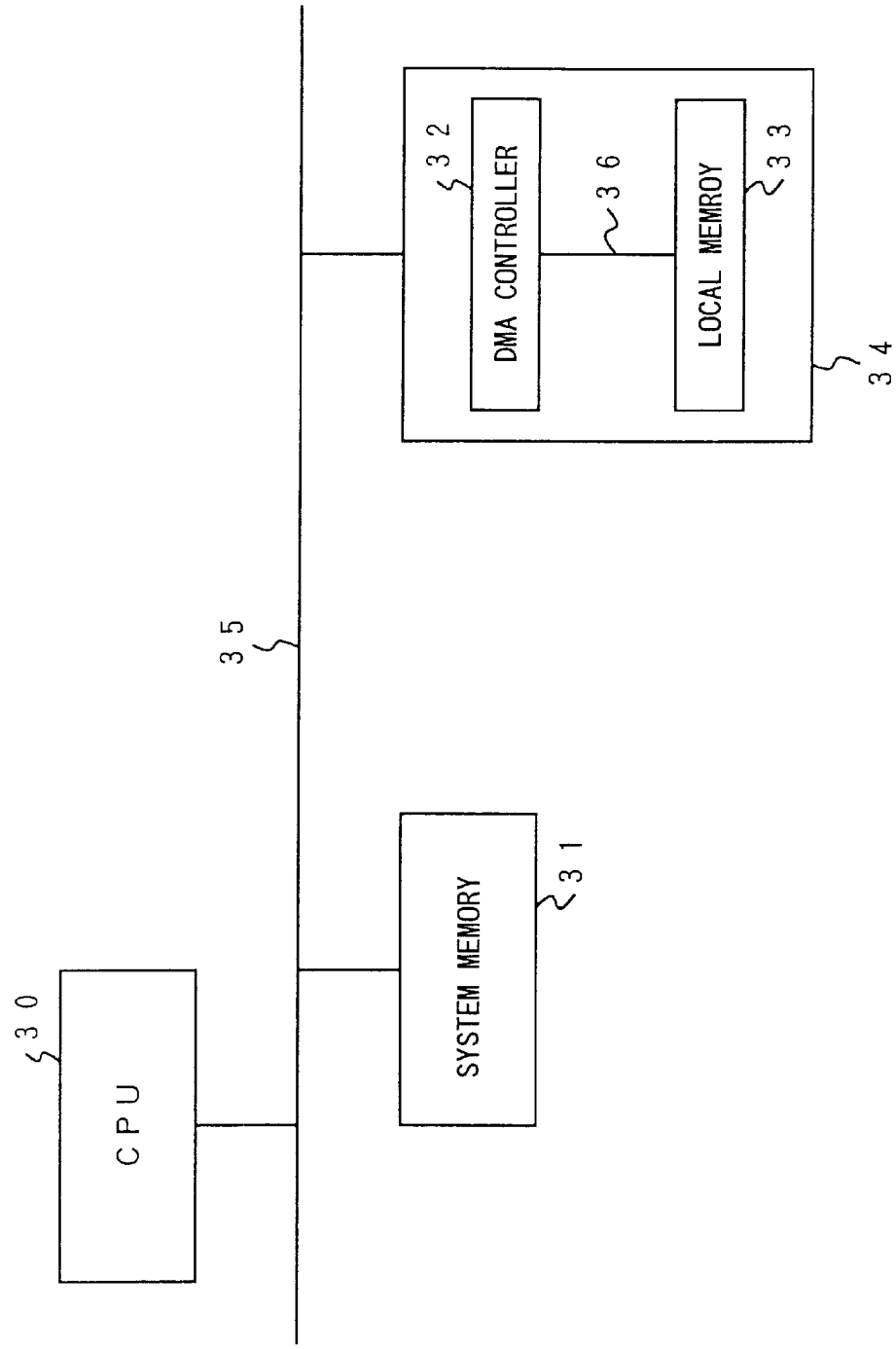
FIG. 2 is a block diagram illustrating a system to which the data transmission system according to the present invention is applied.

A data processing system to which the present invention is applied is formed, as shown in FIG. 2. Referring to FIG. 2, the data processing system has a CPU (Central Processing Unit) 30, a system memory 31 and an adapter 34. The adapter 34 includes a DMA (Direct Memory Access) controller 32 and a local memory 33. The CPU 30, the system memory 31 and the adapter 34 are connected via a system bus 35. The DMA controller 32 and the local memory 33 are connected to each other by a local bus 36.

The DMA controller 32 operates in response to DMA information (including information regarding addresses of a transmission side memory, addresses of a receiving side memory, the amount of transmitted data and a transmission unit) supplied from the CPU 30. In the operation of the DMA controller 32, data is read out from the local memory 33 via the local bus 36, and the read data is transmitted to the system memory 31 via the system bus 35. In addition, the DMA controller 32 reads out data from the system memory 31 via the system bus 35 and transmits the read data to the local memory 33 via the local bus 36.

The bus/address boundary rule is provided to each of the system bus 35 and the local bus 36. The bus/address boundary rule defines data lengths which can be accessed in data transmission starting from respective addresses, as shown in FIG. 3. In the example shown in FIG. 3, in the data transmission starting from an address "0", data having 1 byte, 2 bytes, 4 bytes, 8 bytes and 16 bytes can be accessed, in the data transmission starting from an address "1", only data having 1 byte can be accessed, in the data transmission starting from an address "2", data having 1 byte and 2 bytes can be accessed, in the data transmission starting from an address "3", only data having 1 byte can be accessed, in the data transmission starting from an address "4", data having 1 byte, 2 bytes and 4 bytes can be accessed, in the data transmission starting from an address "5", only data having 1 byte can be accessed, in the data transmission starting from an address "6", data having 1 byte and 2 bytes can be accessed, in the data transmission starting from an address "7", only data having 1 byte can be accessed, in the data transmission starting from an address "8", data having 1 byte, 2 bytes, 4 bytes and 8 bytes can be accessed, in the data transmission starting from an address "9", only data having 1 byte can be accessed, and the like.

In this embodiment, in the system memory 31 and the local memory 33, data having 1 byte is assigned to a single address, as shown in FIG. 4.

Figure 5:
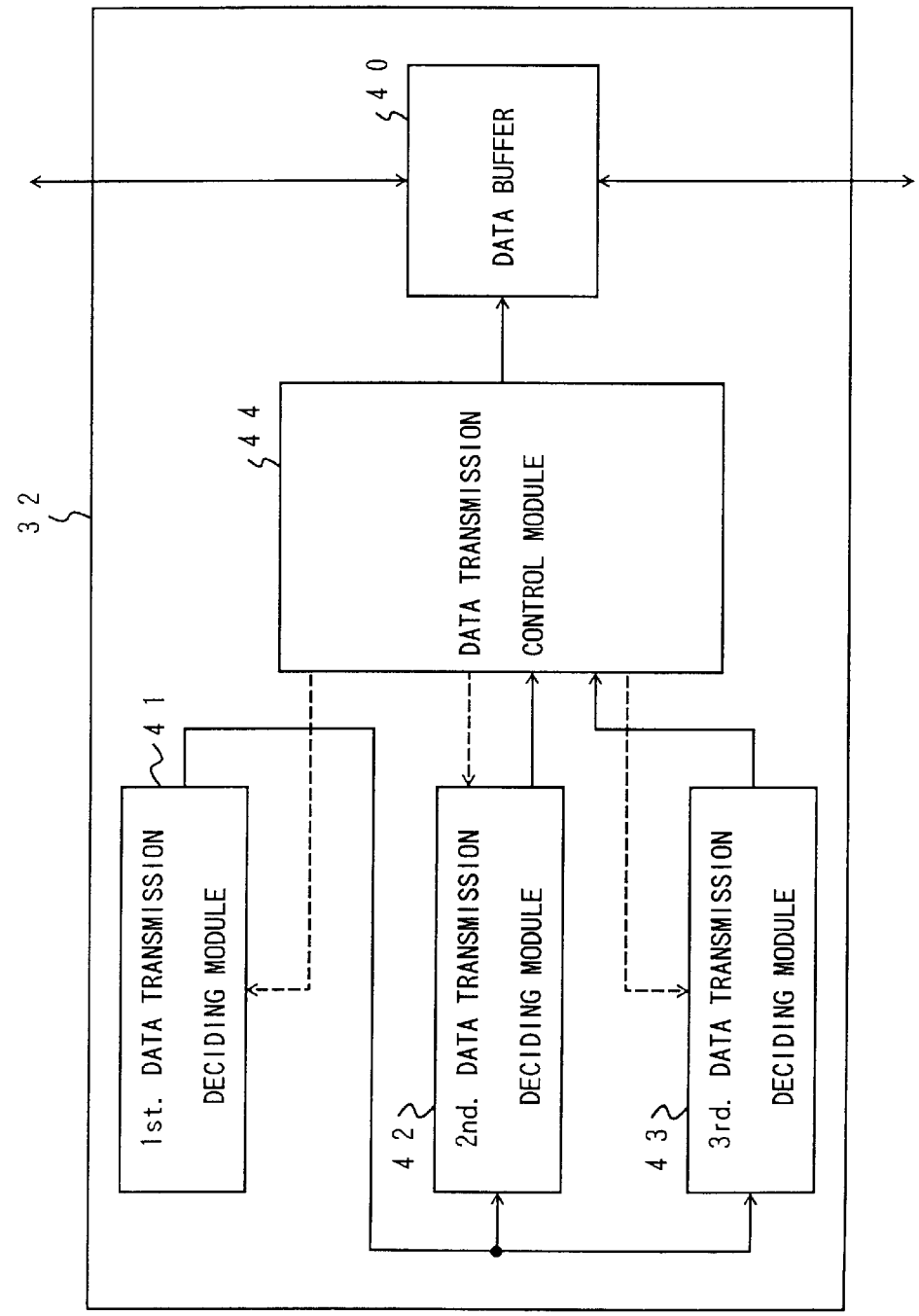
FIG. 5 is a block diagram illustrating a DMA controller provided in the system shown in FIG. 2.

The DMA controller 32 is formed as shown in FIG. 5.

Referring to FIG. 5, the DMA controller 32 has a data buffer 40, a first data transmission unit deciding module 41, a second data transmission unit deciding module 42, a third data transmission unit deciding module 43, and a data transmission control module 44. The data buffer 40 is used for buffering of data. The first data transmission unit deciding module 41 decides a transmission unit of data for addresses which are selected as the standard addresses from the addresses of a transmission side memory and a receiving side memory.

When the first data transmission unit deciding module 41 decides the transmission unit of data for addresses of the receiving side memory, the second data transmission unit deciding module 42 is activated. In the activated state, the second data transmission unit deciding module 42 decides a transmission unit of data for addresses of the receiving side memory. When the first data transmission unit deciding module 41 decides the transmission unit of data for addresses of the transmission side memory, the second data transmission unit deciding module 42 outputs the transmission unit decided by the first data transmission unit deciding module 41.

The third data transmission unit deciding module 43 is activated when the first data transmission unit deciding module 41 decides the transmission unit of data for addresses of the transmission side memory. In the active state, the third data transmission unit deciding module 43 decides a transmission unit of data for the addresses of the receiving side memory. On the other hand, when the first data transmission unit deciding module 41 decides the transmission unit of data for the addresses of the receiving side memory, the third data transmission unit deciding module 43 outputs the transmission unit decided by the first data transmission unit deciding module 41.

The data transmission control module 44 controls a data transmission process between the system memory 31 and the local memory 33 using the transmission units output by the second and third data transmission unit deciding modules 42 and 43. Dashed lines in FIG. 32 indicate control information supplied from the data transmission control module 44 to the first, second and third data transmission unit deciding modules 41, 42 and 43. The control information includes information instructing to update the amount of transmitted data, information instructing to update addresses of receiving side memory and information instructing to update addresses of transmission side memory.

Either the addresses of the receiving side memory or the addresses of the transmission side memory are decided as the standard addresses based on an instruction from the CPU 30. When the addresses of the receiving side memory are selected as the standard addresses, as a basic operation, a batch of data is transmitted from the data buffer 40 to a memory area identified by the addresses of the receiving side memory in accordance with the maximum permissible transmission unit defined in the bus/address boundary rule for the address of the receiving side memory.

Figure 6A:
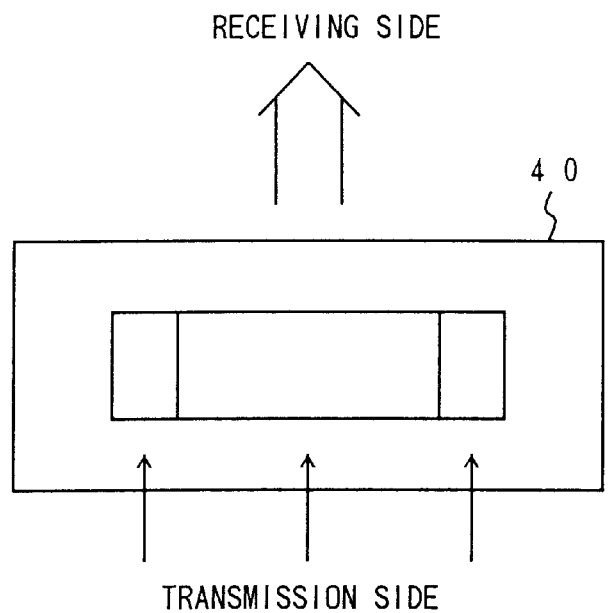
FIGS. 6A and 6B are diagrams illustrating data transmission through a data buffer.

In this case, as shown in FIG. 6A, until the amount of data stored in the data buffer 40 reaches the amount of data corresponding to the maximum permissible transmission unit, data is read out from the transmission side memory (the system memory 31 or the local memory 33) by the transmission unit defined in the bus/address boundary rule for the address of the transmission side memory starting from data at an identified address of the transmission side memory. The data read out from the transmission side memory is then stored in the data buffer 40 by the transmission unit. After this, a batch of data stored in the data buffer is transmitted to the receiving side memory (the system memory 31 or the local memory 33).

On the other hand, when the addresses of the transmission side memory is selected as the standard addresses, as the basic operation, a batch of data is read out from a memory area identified by addresses of the transmission side memory and stored in the data buffer 40 in accordance with the maximum permissible transmission unit defined by the bus/address boundary rule.

Figure 6B:
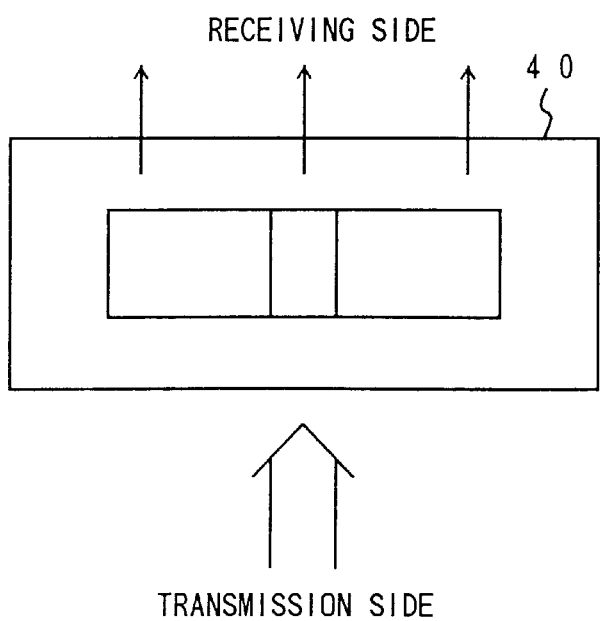

In this case, as shown in FIG. 6B, a batch of data for the maximum permissible transmission unit starting from data at an identified address of the transmission side memory is read out from the transmission side memory and stored in the data buffer 40. After this, the data is read out from the data buffer 40 by the transmission unit defined in the bus/address boundary rule for the addresses of the receiving side memory and transmitted to the receiving side memory.

Figure 7:
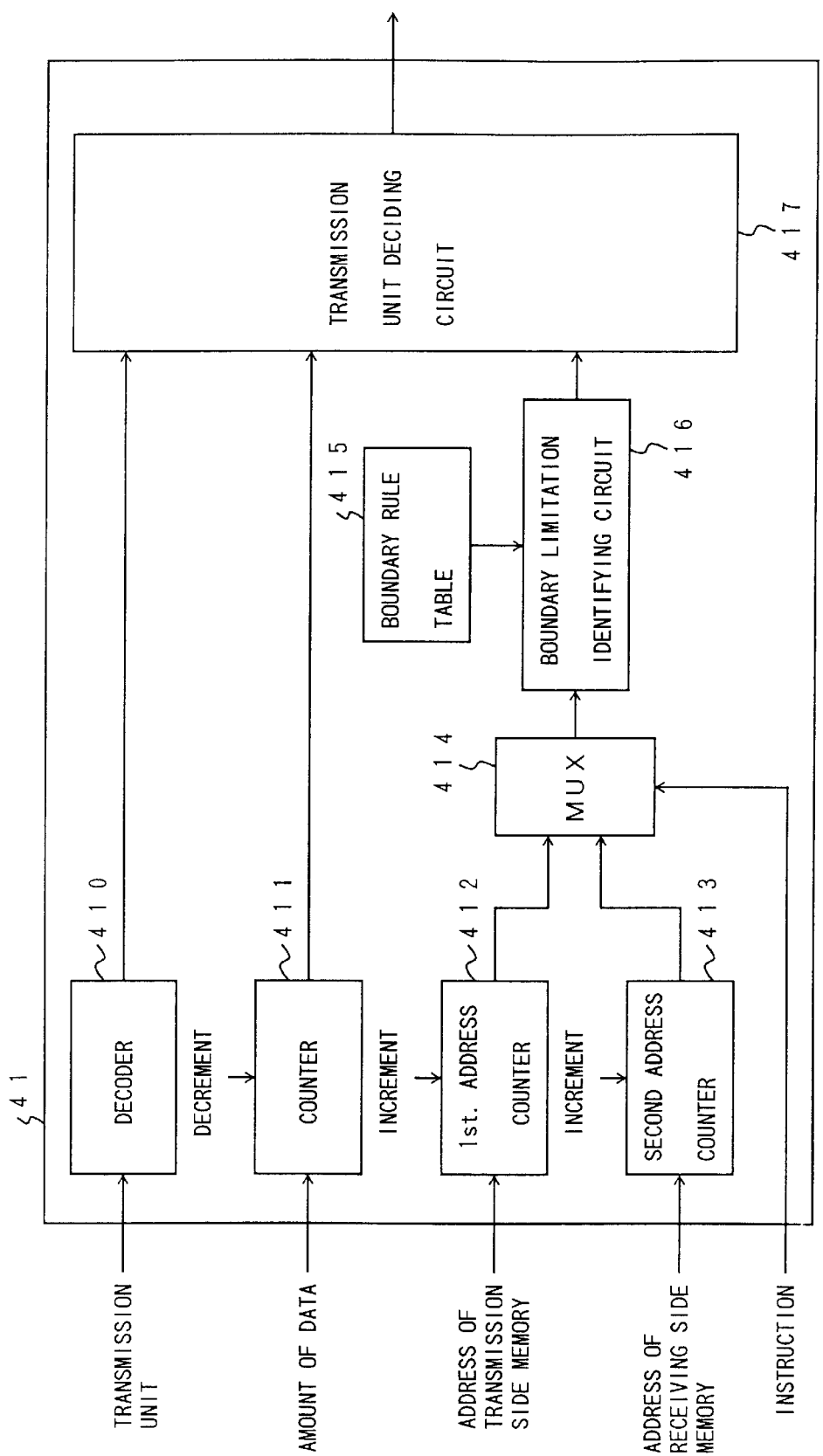
FIG. 7 is a block diagram illustrating a first data transmission unit deciding module provided in the DMA controller shown in FIG. 5.
Figure 8:
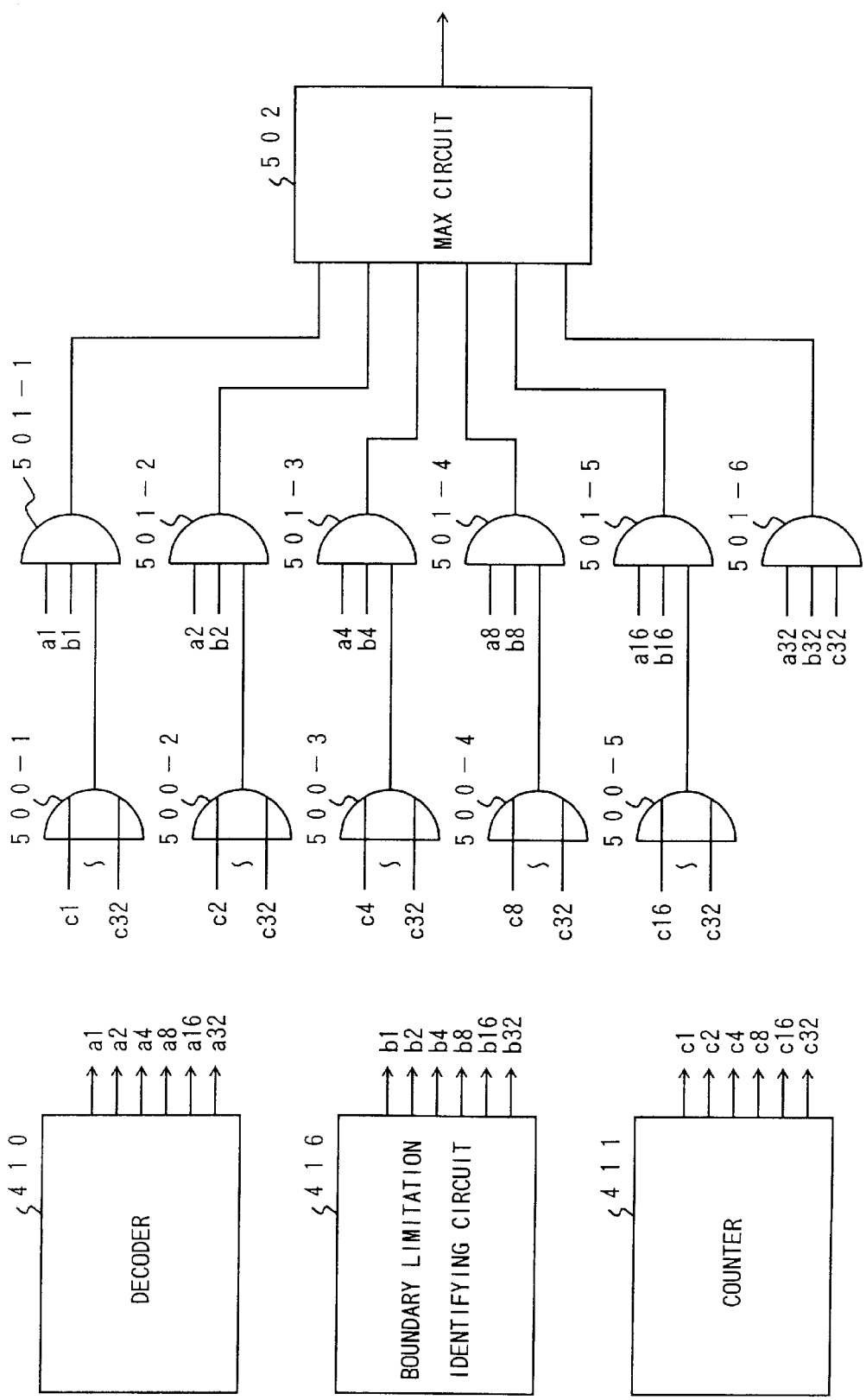
FIG. 8 is a block diagram illustrating a transmission unit deciding circuit provided in the first data transmission unit deciding module shown in FIG. 7.
Figure 9:
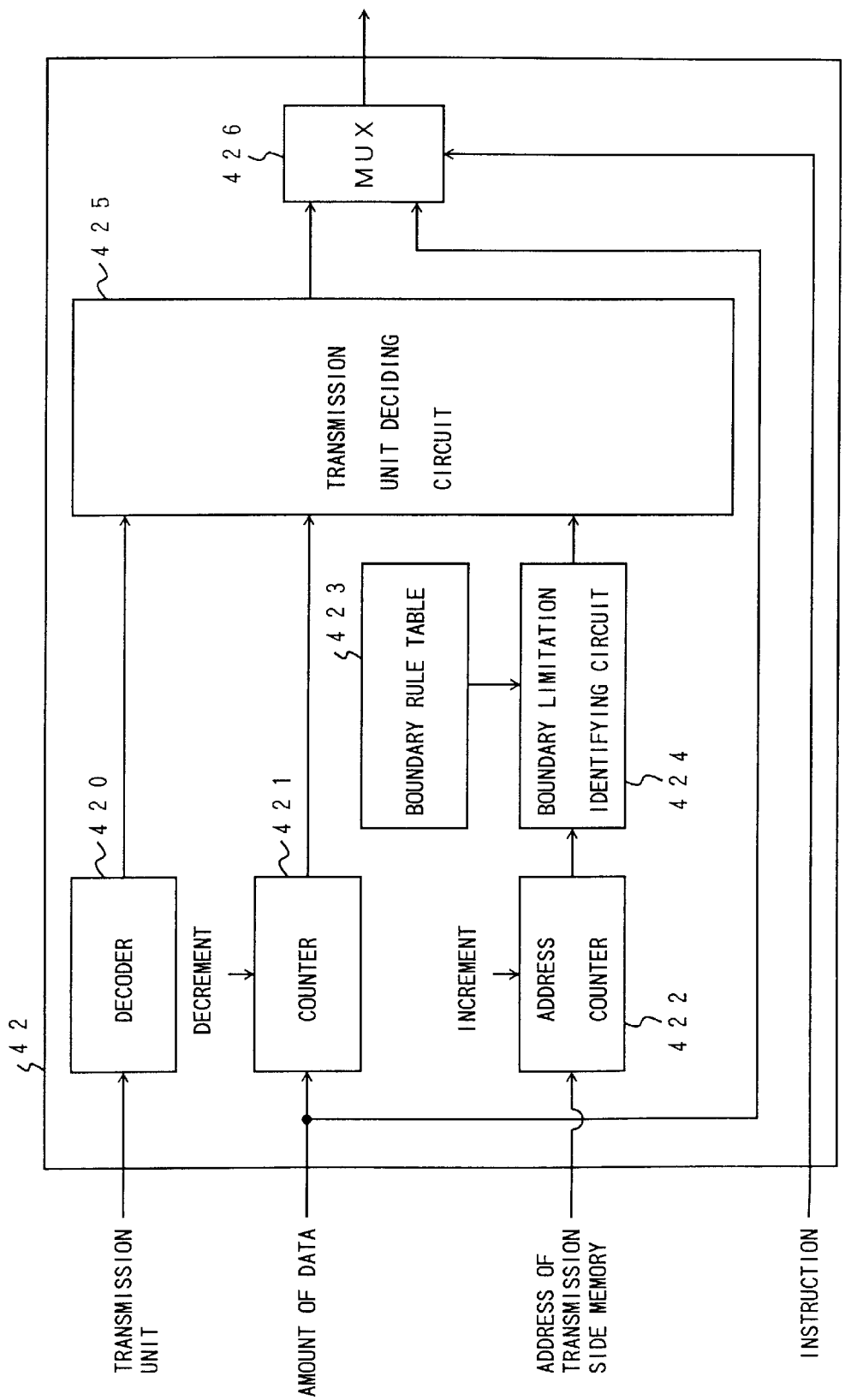
FIG. 9 is a block diagram illustrating a second data transmission unit deciding module provided in the DMA controller shown in FIG. 5.
Figure 10:
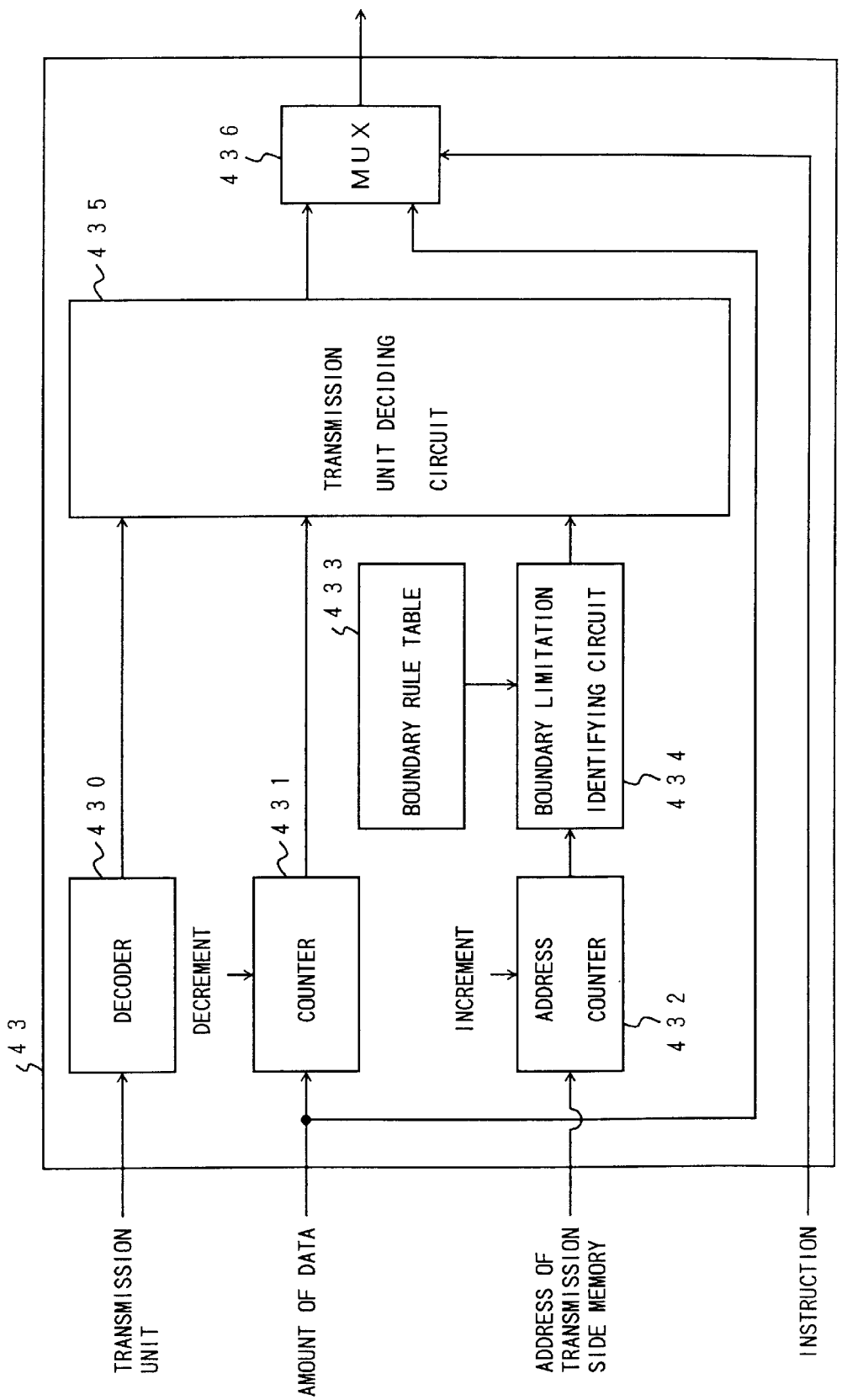
FIG. 10 is a block diagram illustrating a third data transmission unit deciding module provided in the DMA controller shown in FIG. 5.

The first data transmission unit deciding module 41 is formed as shown in FIGS. 7 and 8. The second data transmission unit deciding module 42 is formed as shown in FIG. 9. The third data transmission unit deciding module 42 is formed as shown in FIG. 10.

Referring to FIG. 7, the first data transmission unit deciding module 41 has a decoder 410, a counter 411, an first address counter 412, a second address counter 413, a multiplexer 414, a boundary rule table 415, a boundary limitation identifying circuit 416 and a transmission unit deciding circuit 417. The decoder 410 decodes a transmission unit identified by the CPU 30. For example, in a case where the maximum value of the transmission unit which can be identified by the CPU 30 is equal to 32 bytes, the decoder 410 has six output terminals which correspond to 1 byte, 2 bytes, 4 bytes, 8 bytes, 16 bytes and 32 bytes. For example, when a transmission unit identified by the CPU 30 is equal to 16 bytes, a value "1" is output from the terminals corresponding to 1 byte, 2 bytes, 4 bytes, 8 bytes and 16 bytes, and a value "0" is output from the terminal corresponding to 32 bytes. The output values from the six terminals indicate a decoding result.

The counter 411 is initially set at an initial count value corresponding to the amount of data which should be transmitted. The initial count value is identified by the CPU 30. The count value of the counter 411 is decremented in synchronism with the progress of the data transmission, so that the count value of the counter 411 corresponds to the amount of data which should be transmitted but has not yet been transmitted. For example, in a case where the maximum value which can be identified as the amount of transmitted data by the CPU 30 is equal to 32 bytes, the counter 411 has six output terminals. The six terminals correspond to 1 byte, 2 bytes, 4 bytes, 8 bytes, 16 bytes and 32 bytes. Each of the output terminals of the counter 411 outputs a value "0" or "1". A pattern of values "0" and/or "1" output from the output terminals indicates the amount of data which should be transmitted but has not yet been transmitted.

The first address counter 412 is initially set at an initial value of the address of the transmission side memory. The initial value is identified by the CPU 30. The count value of the first address counter 412 is incremented in synchronism with the progress of the data transmission, so that the address of the transmission side memory is managed. The second address counter 413 is initially set at an initial value of the address of the receiving side memory. The initial value is identified by the CPU 30. The count value of the second address counter 413 is incremented in synchronism with the progress of the data transmission, so that the address of the receiving side memory is managed.

The multiplexer 414 selects, as the standard address, one of the addresses managed by the first and second address counters 412 and 413 in accordance with an instruction from the CPU 30. The boundary rule table 415 manages the bus/address boundary rule as shown in FIG. 3.

The boundary limitation identifying circuit 416 identifies, with reference to the boundary rule table 415, the maximum permissible transmission unit defined in the bus/address boundary rule for the standard address selected by the multiplexer 414. For example, in a case where the boundary rule table 414 indicates the bus/address boundary rule as shown in FIG. 3, the boundary limitation identifying circuit 416 has six output terminals corresponding to 1 bytes, 2 bytes, 4 bytes, 8 bytes, 16 bytes and 32 bytes. When the maximum permissible transmission unit defined in the bus/address boundary rule for the standard address is, for example, equal to 4 bytes, the output terminals corresponding to 1 byte, 2 bytes and 4 bytes output a value "1", and the output terminals corresponding to 8 bytes, 16 bytes and 32 bytes output a value "0".

The transmission unit deciding circuit 417 decides, based on output signals from the decoder 410, the counter 411 and the boundary limitation deciding circuit 416, a transmission unit for the address selected as the standard address.

Referring to FIG. 8, the transmission unit deciding circuit 417 has an OR circuit 500-1 for 1 byte, an OR circuit 500-2 for 2 bytes, an OR circuit 500-3 for 4 bytes, an OR circuit 500-4 for 8 bytes, an OR circuit 500-5 for 16 bytes, an AND circuit 501-1 for 1 byte, an AND circuit 501-2 for 2 bytes, an AND circuit 501-3 for 4 bytes, an AND circuit 501-4 for 8 bytes, an AND circuit 501-5 for 16 bytes, an AND circuit 501-6 for 32 bytes and MAX circuit 502. The OR circuit 500-1 performs an operation of the logical sum of the output signals from the six output terminals, corresponding to 1 byte, 2 bytes, 4 bytes, 8 byte, 16 bytes and 32 bytes, of the counter 411. Thus, the output of the OR circuit 500-1 indicates whether or not there is data which should be transmitted but have not yet been transmitted. The OR circuit 500-2 performs an operation of the logical sum of the output signals from the five output terminals, corresponding to 2 bytes, 4 bytes, 8 bytes, 16 bytes and 32 bytes, of the counter 411. Thus, the output of the OR circuit 500-2 indicates whether or not there is data having 2 bytes or more which should be transmitted but have not yet been transmitted. The OR circuit 500-3 performs an operation of the logical sum of the output signals from the four output terminals, corresponding to 4 bytes, 8 bytes, 16 bytes and 32 bytes, of the counter 411. Thus, the output of the OR circuit 500-3 indicates whether or not there is data having 4 bytes or more which should be transmitted but have not yet been transmitted.

The OR circuit 500-4 performs an operation of the logical sum of the output signals from the three output terminals, corresponding to 8 bytes, 16 bytes and 32 bytes, of the counter 411. Thus, the output of the OR circuit 500-4 indicates whether or not there is data having 8 bytes or more which should be transmitted but have not yet been transmitted. The OR circuit 500-5 performs an operation of the logical sum of the output signals from the two output terminals, corresponding to 16 bytes and 32 bytes, of the counter 411. Thus, the output of the OR circuit 500-5 indicates whether or not there is data having 16 bytes or more which should be transmitted but have not yet been transmitted.

The AND circuit 501-1 performs an operation of the logical product of the output signal from the output terminal, corresponding to 1 byte, of the decoder 410, the output signal from the output terminal, corresponding to 1 byte, of the boundary limitation identifying circuit 416 and the output signal of the OR circuit 500-1. Thus, the output of the AND circuit 501-1 indicates whether or not the data transmission operation by the transmission unit of 1 byte is allowable. The AND circuit 501-2 performs an operation of the logical product of the output signal from the output terminal, corresponding to 2 bytes, of the decoder 410, the output signal from the output terminal, corresponding to 2 bytes, of the boundary limitation identifying circuit 416 and the output signal of the OR circuit 500-2. Thus, the output of the AND circuit 501-2 indicates whether or not the data transmission operation by the transmission unit of 2 bytes is allowable.

The AND circuit 501-3 performs an operation of the logical product of the output signal from the output terminal, corresponding to 4 bytes, of the decoder 410, the output signal from the output terminal, corresponding to 4 bytes, of the boundary limitation identifying circuit 416 and the output signal of the OR circuit 500-3. Thus, the output of the AND circuit 501-3 indicates whether or not the data transmission operation by the transmission unit of 4 bytes is allowable. The AND circuit 500-4 performs an operation of the logical product of the output signal from the output terminal, corresponding to 8 bytes, of the decoder 410, the output signal from the output terminal, corresponding to 8 bytes, of the boundary limitation identifying circuit 416 and the output signal of the OR circuit 500-4. Thus, the output of the AND circuit 501-4 indicates whether or not the data transmission operation by the transmission unit of 8 bytes is allowable.

The AND circuit 501-5 performs an operation of the logical product of the output signal from the output terminal, corresponding to 16 bytes, of the decoder 410, the output signal from the output terminal, corresponding to 16 bytes, of the boundary limitation identifying circuit 416 and the output signal of the OR circuit 500-5. Thus, the output of the AND circuit 501-5 indicates whether or not the data transmission operation by the transmission unit of 16 bytes is allowable. The AND circuit 501-6 performs an operation of the logical product of the output signal from the output terminal, corresponding to 32 bytes, of the decoder 410, the output signal from the output terminal, corresponding to 32 bytes and the output signal from the output terminal, corresponding to 32 bytes, of the counter 411. Thus, the output of the AND circuit 501-6 indicates whether or not the data transmission operation by the transmit unit of 32 bytes is allowable.

The MAX circuit 502 receives output signals of the AND circuits 501-1, 501-2, 501-3, 501-4, 501-5 and 501-6. The MAX circuit 502 determines, based on the received signals, what the largest amount of bytes allowable as the transmission unit is. For example, in a case where the output signals of the AND circuit 500-1 (for indication of the allowance of data transmission by 1 byte), the AND circuit 500-2 (for indication of the allowance of data transmission by two bytes) and the AND circuit 500-3 (for indication of the allowance of data transmission by 4 bytes) respectively have the value "1" and the output signals of the other AND circuits 500-4, 500-5 and 500-6 have the value "0", the MAX circuit 502 determines that the largest amount of bytes allowable as the transmission unit is 4 bytes.

The transmission unit deciding circuit 417 which is formed as described above has the following output characteristic. The maximum permissible transmission unit identified by the boundary limitation identifying circuit 416 may be applied with the limitation based on the transmission unit output from the decoder 410 and the amount of data (the count value of the counter 411) which should be transmitted by have not been transmitted yet. In this case, the transmission unit deciding circuit 417 outputs the limited transmission unit. When the maximum permissible transmission unit is not limited, the transmission unit deciding circuit 417 outputs the maximum permissible transmission unit.

Further, referring to FIG. 9, the second data transmission unit deciding module 42 has a decoder 410, a counter 421, an address counter 422, a boundary rule table 423, a boundary limitation identifying circuit 424, a transmission unit deciding circuit 425 and a multiplexer 426.

The decoder 420 has the same function as the decoder 410 of the first data transmission unit module 41. The counter 421 which receives the transmission unit from the first data transmission unit deciding module 41 has the same function as the counter 411 of the first data transmission unit module 41. The address counter 422 has the same function as the first address counter 412 of the first data transmission unit deciding module 41. The boundary rule table 423 has the same function as the boundary rule table 415 of the first data transmission unit deciding module 41. The boundary limitation identifying circuit 424 which receives the output signal of the address counter 422 has the same function as the boundary limitation identifying circuit 416 of the first data transmission unit deciding module 41. The transmission unit deciding circuit 425 has the same function as the transmission unit deciding circuit 417 of the first data transmission unit deciding module 41.

The first and second data transmission unit deciding modules 41 and 42 differ from each other in that the multiplexer 426 is provided with the second data transmission unit deciding module 42. The multiplexer 426 receives a transmission unit decided by the transmission unit deciding circuit 425 and a transmission unit supplied from the first data transmission unit deciding module 41. When the CPU 30 selects the address of the receiving side memory as the standard address, the multiplexer 426 outputs the transmission unit decided by the transmission unit deciding circuit 425. When the CPU 30 selects the address of the transmission side memory as the standard address, the multiplexer 426 outputs the transmission unit supplied from the first data transmission unit deciding module 41.

The third data transmission unit deciding module 43 has, as shown in FIG. 10, a decoder 430, a counter 431, an address counter 432, a boundary rule table 433, a boundary limitation identifying circuit 434, a transmission unit deciding circuit 435 and a multiplexer 436.

The decoder 430 has the same function as the decoder 410 of the first data transmission unit deciding module 41. The counter 431 which receives the transmission unit supplied from the first data transmission unit deciding module 41 has the same function as the counter 411 of the first data transmission unit deciding module 41. The counter 432 has the same function as the counter 413 of the first data transmission unit deciding module 41. The boundary rule table 433 has the same function as the boundary rule table 415 of the first data transmission unit deciding module 41. The boundary limitation identifying circuit 434 which receives the output signal of the counter 432 has the same function as the boundary limitation identifying circuit 416 of the first data transmission unit deciding module 41. The transmission unit deciding circuit 435 has the same function as the transmission unit deciding circuit 417 of the first data transmission deciding module 41.

The first and third data transmission unit deciding modules 41 and the 43 differ from each other in that the multiplexer 436 is provided with the third data transmission unit deciding module 43. The multiplexer 436 receives a transmission unit supplied from the transmission unit deciding circuit 425 and a transmission unit supplied from the first data transmission unit deciding module 41. When the CPU 30 selects the address of the transmission side memory as the standard address, the multiplexer 436 outputs the transmission unit supplied from the transmission unit deciding circuit 425. When the CPU 30 selects the address of the receiving side memory as the standard address, the multiplexer 436 outputs the transmission unit supplied from the first data transmission deciding module 41.

A description will now be given of operations of the DMA controller 32.

It is assumed that the CPU 30 specifies an address "1" as the address of the transmission side memory, an address "2" as the address of the receiving side memory, 16 bytes as the transmission unit, 32 bytes as the amount of data to be transmitted and the address of the receiving side memory as the standard address.

In the conventional case, the data transmission process can not be performed under the above conditions in which the bus/address boundary rules for the address of the transmission side memory and the receiving side memory differ from each other.

Since the address of the receiving side memory is selected as the standard address, the DMA controller 32 performs a DMA transmission process in the manner as shown in FIG. 6A. That is, in the DMA transmission process, a batch of data is transmitted from the data buffer 40 to a memory area identified by addresses of the receiving side memory in accordance with the maximum permissible transmission unit defined in the bus/address boundary rule for the address of the receiving side memory.

However, when the amount of data which should be transmitted but has not yet been transmitted is less than the maximum permissible transmission unit, a batch of data is transmitted from the data buffer 40 to a memory area identified by addresses of the receiving side memory, in accordance with a transmission unit, corresponding to the amount of data which should be transmitted but has not yet been transmitted, which is decided by the transmission unit deciding circuit 417 shown in FIG. 8. When the transmitted unit identified by the CPU 30 is less than the maximum permissible transmission unit, a batch of data transmitted from the data buffer 40 to a memory area identified by addresses of the receiving side memory, in accordance with the transmission unit specified by the CPU 30. When the amount of data which should be transmitted but has not yet been transmitted and a transmission unit specified by the CPU 30 are less than the maximum permissible transmission unit, a batch of data is transmitted from the data buffer 40 to a memory area identified by addresses of the receiving side memory, in accordance with a transmission unit which is the smaller one of the amount of data to be transmitted but having not yet been transmitted and the transmission unit specified by the CPU 30.

Figure 11:
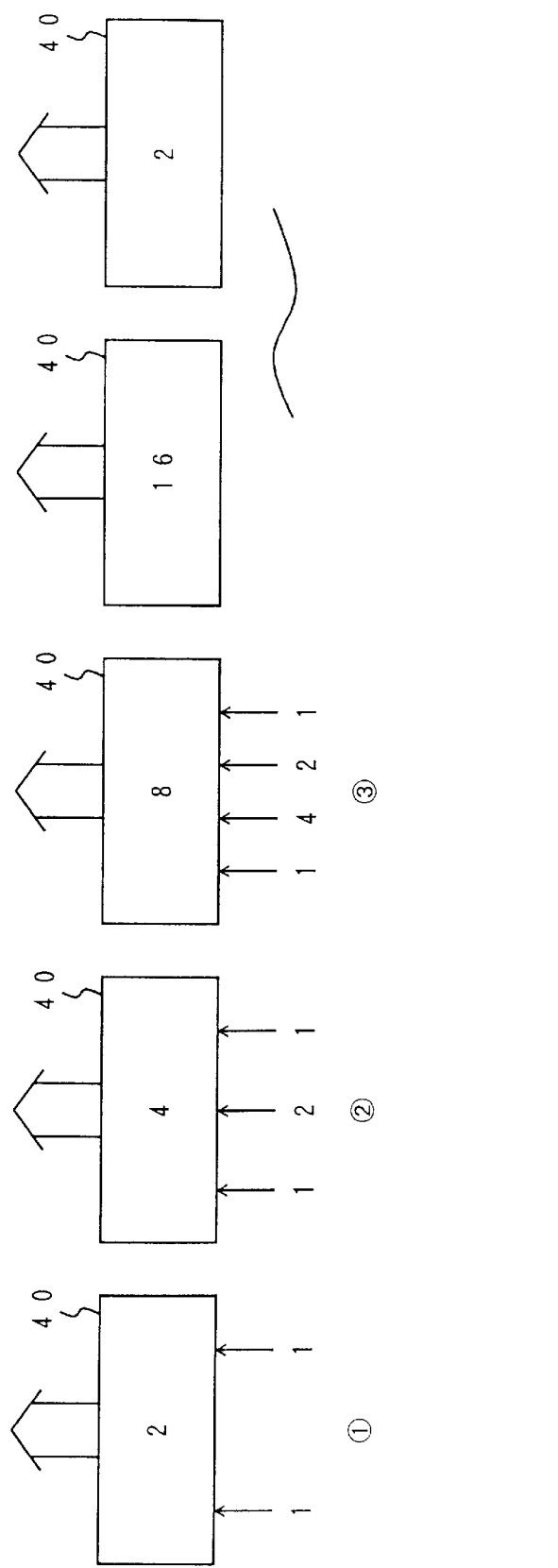
FIG. 11 is diagram illustrating examples of data transmission operations.

The CPU 30 specifies an address "2" as the address of the receiving side memory, an address "1" as the address of the transmission side memory, 16 bytes as the transmission unit and 32 bytes as the amount of data to be transmitted. The CPU 30 further outputs instructions for the DMA transmission process. The first data transmission unit deciding module 41 then decides 2 bytes as the transmission unit for addresses of the receiving side memory as shown in FIG. 11①, in accordance with the bus/address boundary rule as shown in FIG. 3. That is, it is decided that after the amount of data stored in the data buffer 40 reaches 2 bytes, a batch of data (2 bytes) is transmitted to a memory area identified by the address (the address "2") of the receiving side memory.

The third data transmission unit deciding module 43 thus decides 2 bytes as the transmission unit for the addresses of the receiving side memory. The information regarding the transmission unit of 2 bytes is supplied to the data transmission control module 44. In addition, the second data transmission unit deciding module 42 which has received information regarding the transmission unit of 2 bytes decides, in accordance with the bus/address boundary rule shown in FIG. 3, 1 byte as the transmission unit in a first reading operation using the data buffer 40 and 1 byte as the transmission unit in a second reading operation, as shown in FIG. 11①. The information regarding the transmission unit in each of the first and second reading operations using the data buffer 40 is supplied to the data transmission control module 44.

The data transmission control module 44 which has received the transmission units from the third data transmission unit deciding module 43 and the second data transmission unit deciding module 42 reads data out of the transmission side memory byte by byte (the decided transmission unit) and stores in the data buffer 40. After the amount of data stored in the data buffer 40 reaches 2, the data transmission control module 44 transmits a batch of data of 2 bytes from the data buffer 40 to the memory area identified by the address (the address "2") of the receiving side memory.

After this, the first data transmission unit deciding module 41 decides, in accordance with the bus/address boundary rule shown in FIG. 3, 4 bytes as the transmission unit for the address of the receiving side memory, as shown in FIG. 11 ②. That is, it is decided that after the amount of data stored in the data buffer 40 reaches 4 bytes, a batch of data is transmitted to a memory area identified by an address (an address "4") of the receiving side memory.

Then, the third data transmission unit deciding module 43 decides 4 bytes as the transmission unit for the address of the receiving side memory. The information regarding this transmission unit is supplied to the data transmission control module 44. In addition, the second data transmission unit deciding module 42 which has received information regarding the transmission unit of 4 bytes decides, in accordance with the bus/address boundary rule shown in FIG. 3, 1 byte as the transmission unit in a first reading operation using the data buffer 40, 2 bytes as the transmission unit in a second reading operation and 1 byte as the transmission unit in a third reading operation. These transmission units in the first, second and third reading operations using the data buffer 40 are supplied to the data transmission control module 44.

The data transmission control module 44 then reads out of the transmission side memory data of 1 byte in the first reading operation, data of 2 bytes in the second reading operation and data of 1 byte in the third transmission operation. The data read out of the transmission side memory is stored in the data buffer 40. After the amount of data stored in the data buffer 40 reaches 4 bytes in the three reading operations, a batch of data of 4 bytes is transmitted to a memory area identified by the address (an address "4") of the receiving side memory.

After this, the first transmission unit deciding module 41 decides, in accordance with the bus/address boundary rule shown in FIG. 3, 8 bytes as the transmission unit for the addresses of the receiving side memory, as shown in FIG. 11 ③. That is, it is decided that after data of 8 bytes is completely stored in the data buffer 40, a batch of data of 8 bytes is transmitted to an memory area identified by the address (an address "8") of the receiving side memory.

In response to the decision by the first transmission unit deciding module 41, the third data transmission unit deciding module 43 decides 8 bytes as the transmission unit for the address of the transmission side memory. The third data transmission unit deciding module 43 informs the data transmission control module 44 of the data transmission unit of 8 bytes. The second data transmission unit deciding module 42 then decides, in accordance with the bus/address boundary rule shown in FIG. 3, 1 byte as the transmission unit in a first reading operation using the data buffer 40, 4 bytes as the transmission unit in a second reading operation, 2 bytes as the transmission unit in a third reading operation, and 1 byte as the transmission unit in a fourth reading operation. These transmission units in the first, second, third and fourth reading operations using the data buffer 40 are supplied to the data transmission control module 44.

The data transmission control module 44 then reads out of the transmission side memory data of 1 byte in the first reading operation, data of 4 bytes in the second reading operation, data of 2 bytes in the third reading operation and data of 1 byte in the fourth transmission operation. The data read out of the transmission side memory is stored in the data buffer 40. After the amount of data stored in the data buffer 40 reaches 8 bytes in the four reading operations, a batch of data of 8 bytes is transmitted to a memory area identified by the address (an address "4") of the receiving side memory.

After this, in the same manner (see FIG. 6A) as in the cases described above, the data for the transmission unit decided by the first data transmission unit deciding module 41 is read out of the transmission side memory in accordance with the bus/address boundary rule for the addresses of the transmission side memory. The data read out of the transmission side memory is stored in the data buffer 40. A batch of data is then transmitted from the data buffer 40 to the receiving side memory.

As has been described above, when the address of the receiving side memory is selected as the standard address, the data read out of the transmission side memory is transmitted to the receiving side memory under a condition in which the bus/address boundary rule for the address of the receiving side memory is prior to that for the address of the transmission side memory.

Figure 12:
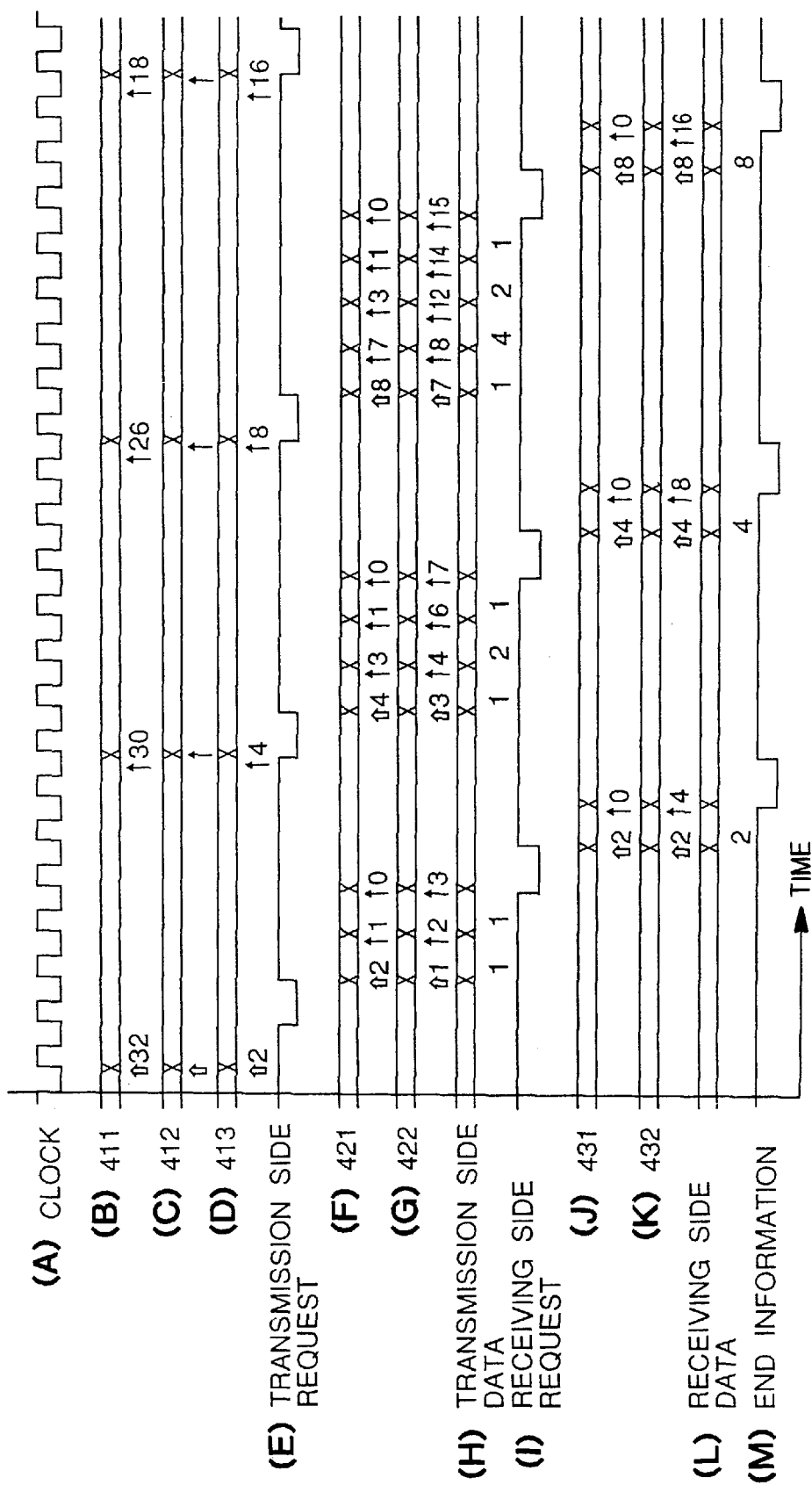
FIG. 12 is a timing chart illustrating examples of operations in the DMA controller.

FIG. 12 shows a timing chart indicating operations in the above cases. In FIG. 12, thick arrows indicate initializing times and thin arrows indicate times at which decrement/increment operations are preformed.

On the other hand, when the address of the transmission side address is selected as the standard address, the transmission operation is performed in the manner as shown in FIG. 6B. That is, a batch of data for a transmission unit deciding by the first data transmission unit deciding module 41 is read out of the transmission side memory and stored in the data buffer 40. After this, the data stored in the data buffer 40 is divided in accordance with the bus/address boundary rule for the address of the receiving side memory and transmitted to the receiving side memory.

As has been described above, when the address of the receiving side memory is selected as the standard address, the data is read out of the transmission side memory and transmitted to the receiving side memory under a condition in which the bus/address boundary rule for the address of the transmission side memory is prior to that for the address of the receiving side memory.

In the above embodiment, the standard address is not fixed. However, the standard address may be fixed at either the address of the receiving side memory or the address of the transmission side memory. In a case where the standard address is fixed at the address of the receiving side memory, the first address counter 412 (C) and the multiplexer 414 are not needed for the first data transmission unit deciding module 41 (see FIG. 7). The transmission unit decided by the first data transmission unit deciding module 41 is directly supplied to the data transmission control module 44. Further, the third data transmission unit deciding module 43 is not needed for the DMA controller 32 (see FIG. 5) and the multiplexer 426 is not needed for the second data transmission unit deciding module 42 (see FIG. 9).

On the other hand, in a case where the standard address is fixed at the address of the transmission side memory, the second address counter 413 (D) and the multiplexer 414 is not needed for the first data transmission unit deciding module 41 (FIG. 7). The transmission unit decided by the first data transmission unit deciding module 41 is directly supplied to the data transmission control module 44. Further, the second data transmission unit deciding module 42 is not needed for the DMA controller 32 (FIG. 5) and the multiplexer 436 is not needed for the third data transmission unit deciding module 43 (FIG. 10).

In the embodiment described above, the CPU 30 specifies the transmission unit since the transmission unit for the bus may be limited. However, in a case where the transmission unit for the bus is not limited, the data transmission unit which is decided in accordance with the bus/address boundary rule is limited based on the amount of data which should be transmitted but has not yet transmitted.

In addition, in the above embodiment, the same bus/address boundary rule is applied to both the system bus 35 and the local bus 36. However, even if the bus/address boundary rule applied to the system bus 35 differs from that applied to the local bus 36, the present invention is applicable to the system shown in FIG. 2.

The present invention is not limited to the aforementioned embodiments, and other variations and modifications may be made without departing from the scope of the claimed invention.

What is claimed is:

1. A data transmission system in which data read out of a first memory is transmitted to a second memory, comprising:

buffer means for temporarily storing data to be transmitted to said second memory;

first identifying means for identifying a maximum permissible transmission unit defined by a bus/address boundary rule for addresses of said second memory, the maximum permissible transmission unit being a maximum data length which can be accesses in a single transmission operation based on the bus/address boundary rule;

first deciding means for deciding a transmission unit of data to be transmitted to said second memory based on an amount of data which should be transmitted but has not yet been transmitted and the maximum permissible transmission unit identified by said first identifying means, the transmission unit being a unit amount of data to be transmitted;

storing control means for reading data for the transmission unit decided by said first deciding means out of said first memory starting from data stored at an identified address of said first memory, in accordance with the bus/address boundary rule for the address of the first memory, and for storing the data in said buffer means; and transmission control means for transmitting a batch of data stored in the buffer means to said second memory.

2. The data transmission system as claimed in claim 1, wherein said first deciding means decides the transmission unit to be less than a maximum transmission unit when the maximum transmission unit of data to be transmitted to said second memory is specified.

3. The data transmission system as claimed in claim 1 further comprising:

second identifying means for identifying the maximum permissible transmission unit defined by the bus/address boundary rule for addresses of said first memory; and second deciding means for deciding a transmission unit of data to be read out of said first memory based on the transmission unit decided by said first deciding means and the maximum permissible transmission unit identified by said second identifying means, wherein said storing control means divisionally reads data out of said first memory with updating the address of said first memory based on the transmission unit decided by said second deciding means and stores the data in said buffer means.

4. The data transmission system as claimed in claim 3, wherein said second deciding means decides the transmission unit to be less than a maximum transmission unit when the maximum transmission unit of data to be read out of said first memory is specified.

5. A data transmission system in which data read out of a first memory is transmitted to a second memory, comprising:

buffer means for temporarily storing data to be transmitted to said second memory;

first identifying means for identifying a maximum permissible transmission unit defined by a bus/address boundary rule for addresses of said first memory, the maximum permissible transmission unit being a maximum data length which can be accessed in a single transmission operation based on the bus/address boundary rule;

first deciding means for deciding a transmission unit of data to be read out of said first memory based on an amount of data which should be transmitted but has not yet been transmitted and the maximum permissible transmission unit identified by said first identifying means, the transmission unit being a unit amount of data to be transmitted;

storing control means for reading out a batch of data for the transmission unit decided by said first deciding means from said first memory starting from data stored at an identified address of said first memory; and transmission control means for transmitting the data stored in said buffer means to said second memory in accordance with the bus/address boundary rule for addresses of said second memory.

6. The transmission system as claimed in claim 5, wherein said first deciding means decides the transmission unit to be less than a maximum transmission unit when the maximum transmission unit of data to be read out of said first memory is specified.

7. The transmission system as claimed in claim 5 further comprising second identifying means for identifying the maximum permissible transmission unit defined by the bus/address boundary rule for addresses of the second memory; and second deciding means for deciding a transmission unit of data to be transmitted to said second memory based on the transmission unit decided by said first deciding means and the maximum permissible transmission unit identified by said second identifying means, wherein said transmission control means divisionally reads data out of said buffer means and transmits the data to said second memory with updating the address of said second memory based on the transmission unit decided by said second deciding means.

8. The transmission system as claimed in claim 7, wherein said second deciding means decide the transmission unit to be less than a maximum transmission unit when the maximum transmission unit of data to be transmitted to said second memory is specified.

9. A transmission system in which data read out of a first memory is transmitted to a second memory, comprising:

buffer means for temporarily storing data to be transmitted to said second memory;

selecting means for selecting, as standard addresses, either addresses of said first memory or addresses of said second memory;

first identifying means for identifying a maximum permissible transmission unit defined by a bus/address boundary rule for the addresses selected as the standard addresses by said selecting means, the maximum permissible transmission unit being a maximum data length which can be accessed in a single transmission operation based on the bus/address boundary rule;

first deciding means for deciding a transmission unit of data to be transmitted to said second memory when said selecting means selects the address of said second memory and for deciding a transmission unit of data to be read out of said first memory when said selecting means selects the address of said first memory, based on an amount of data which should be transmitted but has not yet been transmitted and the maximum permissible transmission unit identified by said first identifying means, the transmission unit being a unit amount of data to be transmitted;

first storing control means for, when said selecting means selects the address of said second memory as the standard address, reading out data for the transmission unit decided by said first deciding means from said first memory starting from data stored at an identified address of said first memory, in accordance with the bus/address boundary rule, and for storing the data in said buffer means;

second storing control means for, when said selecting means selects the address of said first memory as the standard address, reading out a batch of data for the transmission unit decided by said first deciding means from said first memory starting from data stored at an identified address of said first memory; and transmission control means for transmitting a batch of data stored in said buffer means to said second memory when said selecting means selects the addresses of said second memory as the standard addresses and for transmitting the data stored in said buffer means to said second memory in accordance with the bus/address boundary rule for the address of said second memory when said selecting means selects the addresses of said second memory as the standard addresses.

10. The data transmission system as claimed in claim 9 further comprising:

second identifying means for identifying the maximum permissible transmission unit defined by the bus/address boundary rule for the addresses of said first memory when said selecting means selects the addresses of said second memory as the standard addresses; and second deciding means for deciding a transmission unit of data to be read out of said first memory based on the transmission unit decided by said first deciding means and the maximum permissible transmission unit identified by said second identifying means, wherein said first storing control means divisionally reads data out of said buffer means and transmits the data to said second memory with updating the address of said second memory based on the transmission unit decided by said second deciding means.

11. The data transmission system as claimed in claim 9 further comprising:

third identifying means for identifying the maximum permissible transmission unit defined by the bus/address boundary rule for the address of the second memory when said selecting means selects the address of said first memory as the standard addresses; and third deciding means for deciding a transmission unit of data to be transmitted to said second memory based on the transmission unit decided by said first deciding means and the maximum permissible transmission unit identified by said third identifying means, wherein said transmission control means divisionally reads the data out of said buffer means and transmits the data to said second memory with updating the address of said second memory based on the transmission unit decided by said third deciding means.

12. A data transmission system in which data read out of a first memory having an associated first bus/address boundary rule is transmitted to a second memory having an associated second bus/address boundary rule, comprising:

a buffer to temporarily store data to be transmitted from said first memory to said second memory;

a first identifying unit to identify a first maximum permissible transmission unit defined by the first bus/address boundary rule;

a second identifying unit to identify a second maximum permissible transmission unit defined by the second bus/address boundary rule;

a first deciding unit to decide a transmission unit of data to be transmitted from said first memory to said second memory based on an amount of untransmitted data in said first memory and the first and second maximum permissible transmission units; and a first control unit to read data from said first memory as a plurality of said transmission units into said buffer in accordance with the first bus/address boundary rule, and to output the plurality of said transmission units from said buffer into said second memory in accordance with the second bus/address boundary rule.

* * * * *

UNITED STATES PATENT AND TRADEMARK OFFICE
CERTIFICATE OF CORRECTION

PATENT NO.: 6,058,251
DATED     : May 2, 2000
INVENTOR(S): Rikiya OKAMOTO et al.

It is certified that error appears in the above-identified patent and that said Letters Patent is hereby corrected as shown below:

Col. 17,    line 24, change "accesses" to --accessed--.

Col. 18,    line 36, after "comprising" insert --:--;
            line 52, change "decide" to --decides--.

Col. 19,    line 25, change "address" to --addresses--.

Signed and Sealed this

Third Day of April, 2001

Attest:

NICHOLAS P. GODICI

Attesting Officer    Acting Director of the United States Patent and Trademark Office